(12) United States Patent
Acosta et al.

(10) Patent No.: US 6,512,569 B1
(45) Date of Patent: Jan. 28, 2003

(54) LIQUID CRYSTAL DISPLAY DEVICE AND A METHOD OF MANUFACTURE THEREOF, AND A SUBSTRATE AND A METHOD OF MANUFACTURE THEREOF

(75) Inventors: Elizabeth J. Acosta, Botley (GB); Martin D. Tillin, Abingdon (GB); Michael J. Towler, Botley (GB); Harry G. Walton, Cowley (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/421,176

(22) Filed: Oct. 19, 1999

(30) Foreign Application Priority Data

Oct. 20, 1998 (GB) ............................................. 9822762

(51) Int. Cl.[7] ............................................. C09K 19/02
(52) U.S. Cl. ...................................... 349/181; 349/129
(58) Field of Search ................................. 349/129, 469, 349/181

(56) References Cited

U.S. PATENT DOCUMENTS 4,400,060 A    8/1983   Cheng ........................ 350/339
4,472,026 A  * 9/1984   Boyd et al. ................... 349/21
6,424,396 B1 * 7/2002   Kim et al. ................... 349/130

FOREIGN PATENT DOCUMENTS

EP    0 965 876    6/1999
JP    11-7018      1/1999

* cited by examiner

Primary Examiner—James Dudek
(74) Attorney, Agent, or Firm—Renner, Otto, Boisselle & Sklar, LLP

(57) ABSTRACT

An OCB device comprises upper and lower substrates, each provided with an alignment layer. A liquid crystal layer is provided between the substrates. The lower substrate has a low pre-tilt in regions A and C, so that an H-state is stable in these regions when no voltage is applied across the liquid crystal layer. Region B has a high pre-tilt on the lower substrate, so that a HAN state is stable in region B under zero applied voltage. When a voltage is applied across the liquid crystal lever, a V-state is formed at the interface between the HAN-state and the H-states. This V-state then displaces the H-states in regions A and C. The high pre-tilt region, region B, is acting as a nucleation region. The V-state forms at a lower applied voltage than if the nucleation region is not provided.

13 Claims, 15 Drawing Sheets

OCB/Pi-cell Δε > 0
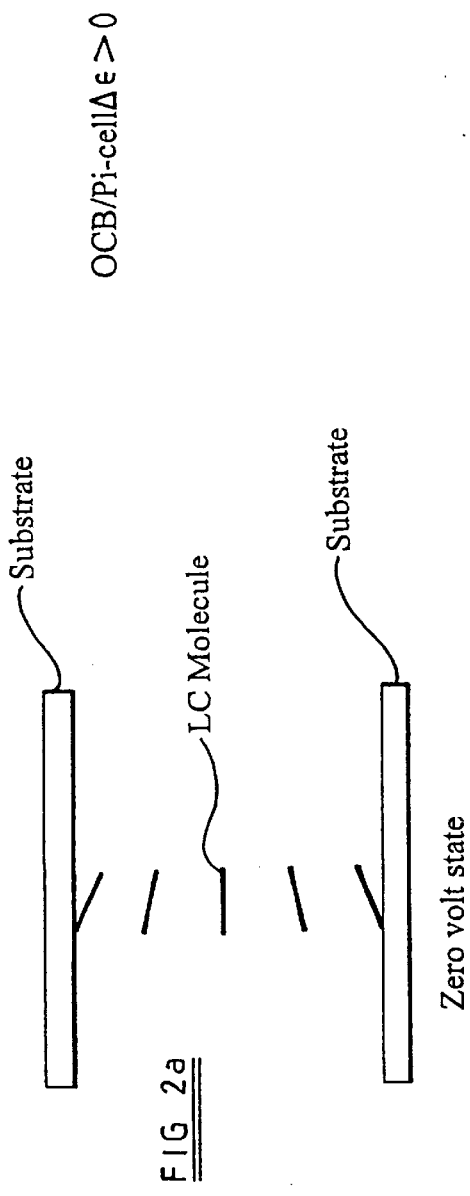
FIG 2a
Zero volt state
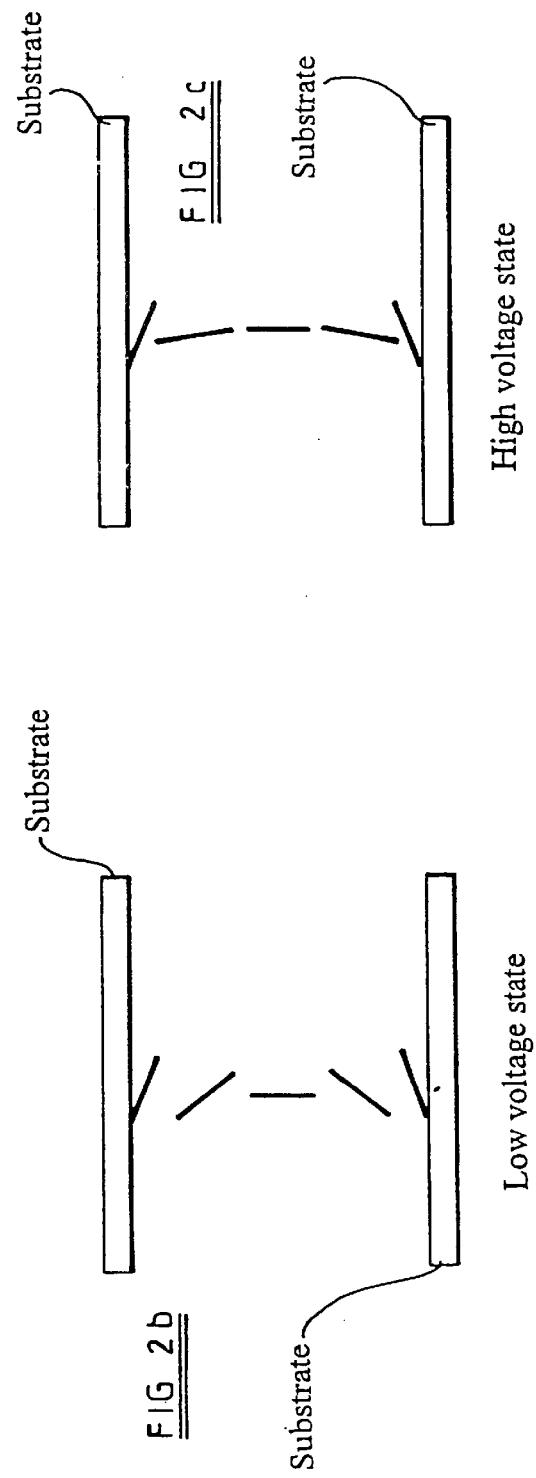
FIG 2c
High voltage state
FIG 2b
Low voltage state

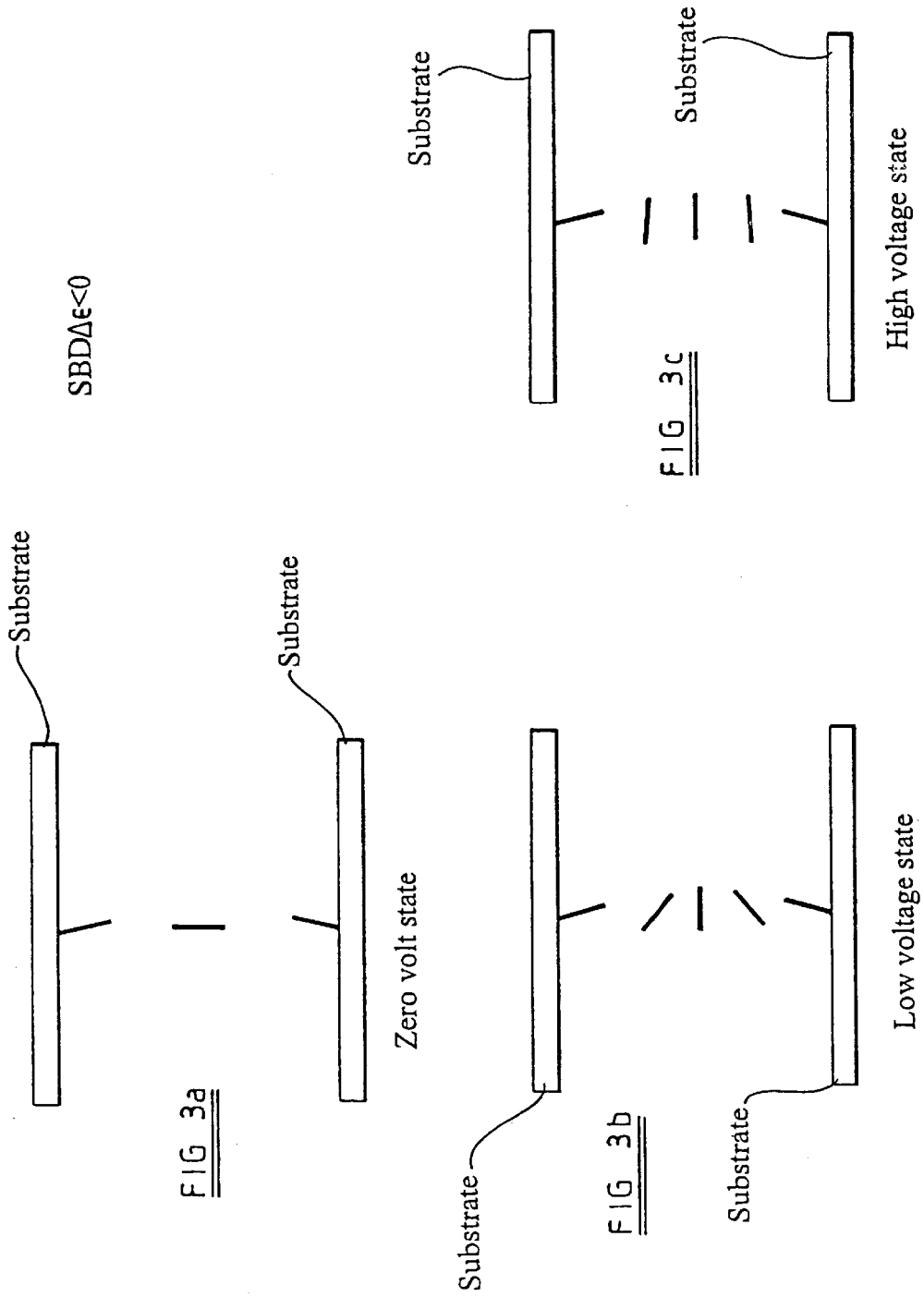

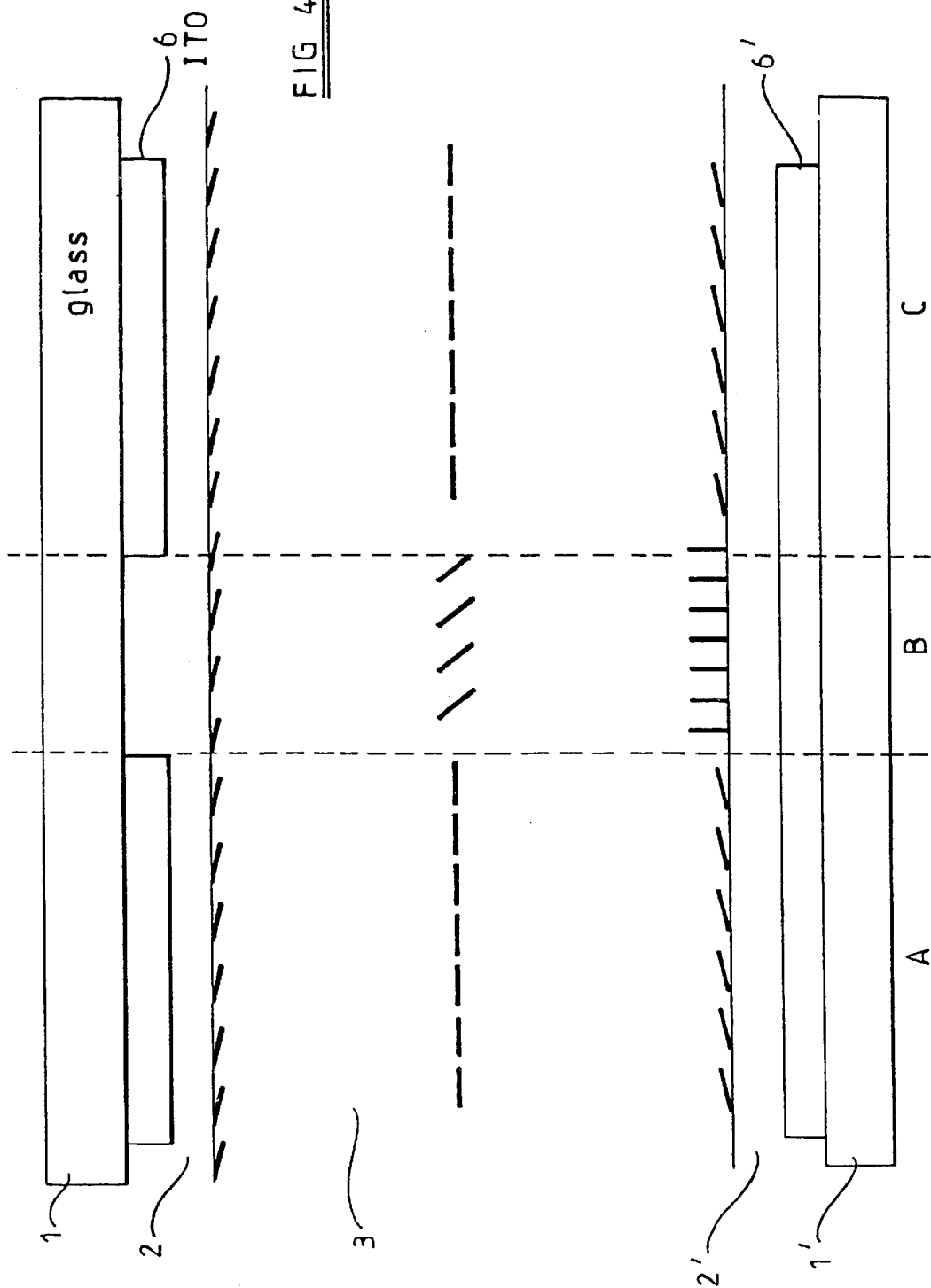

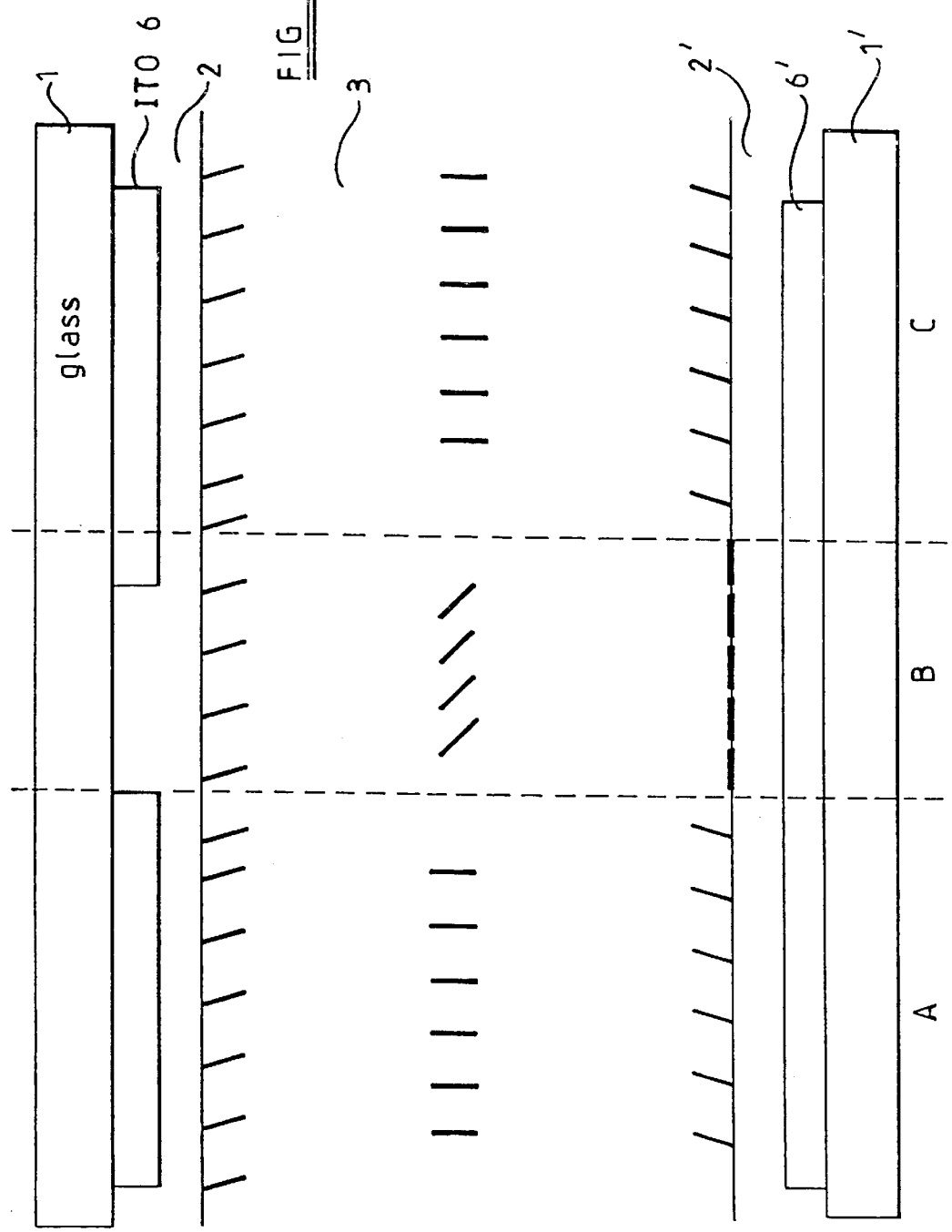

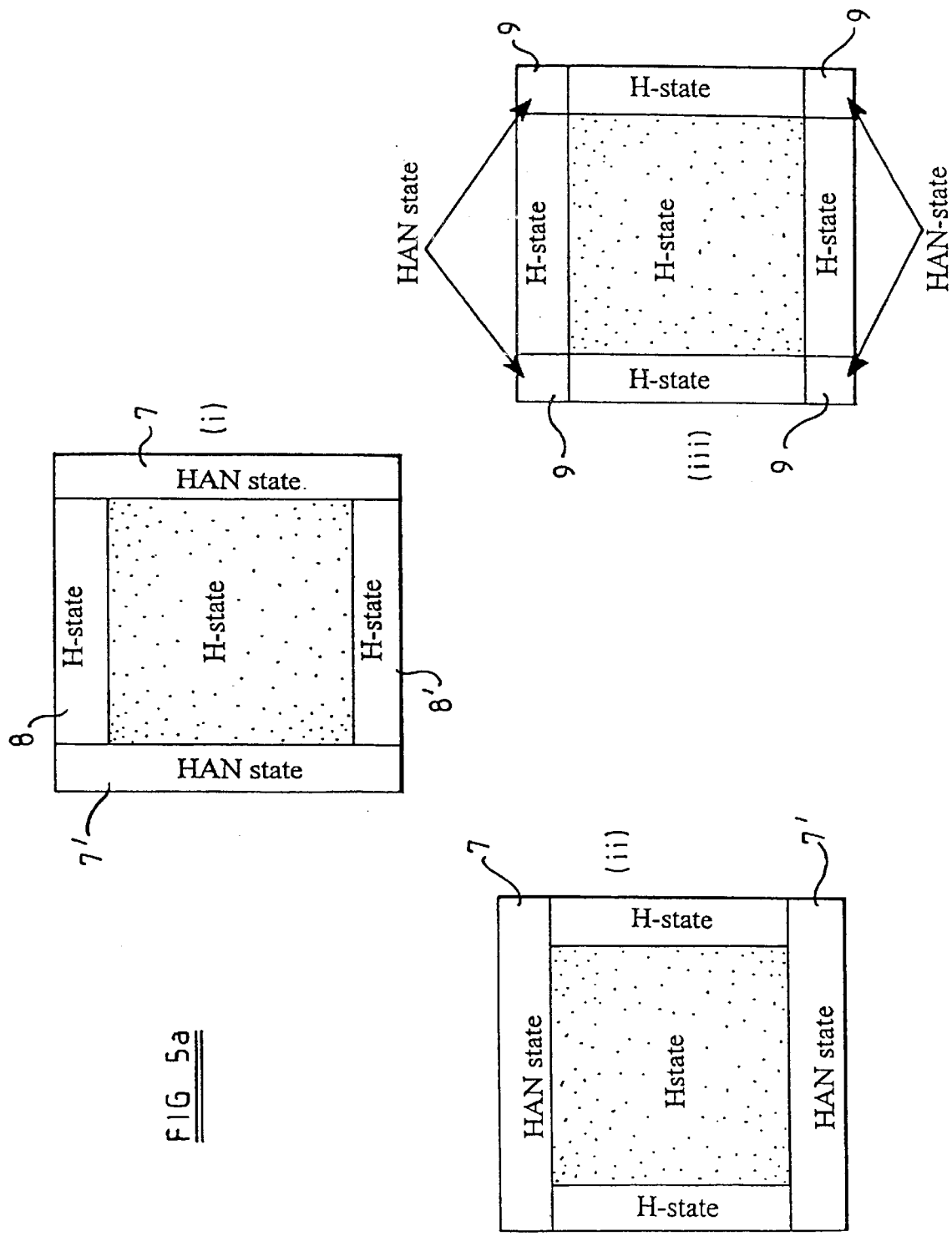

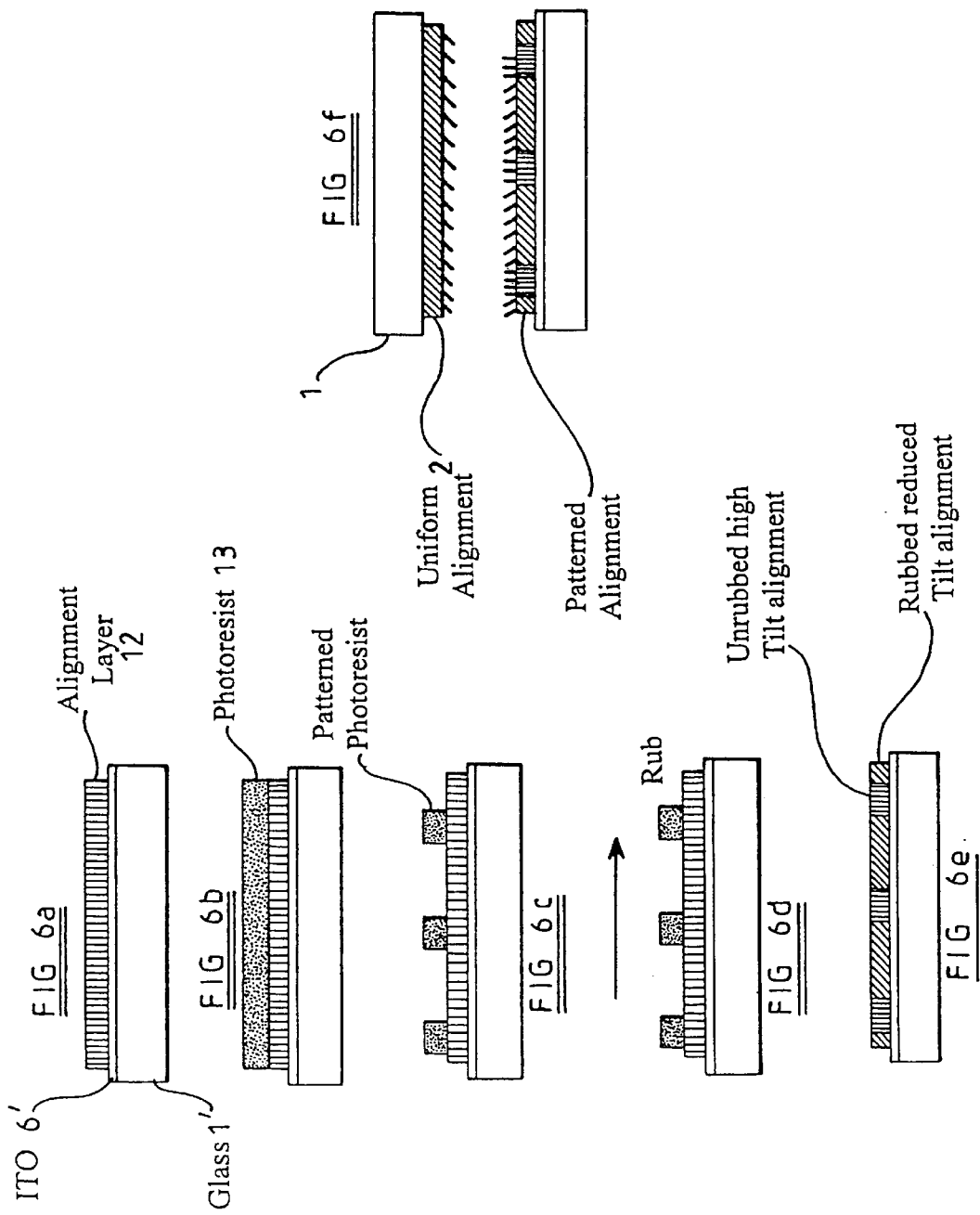

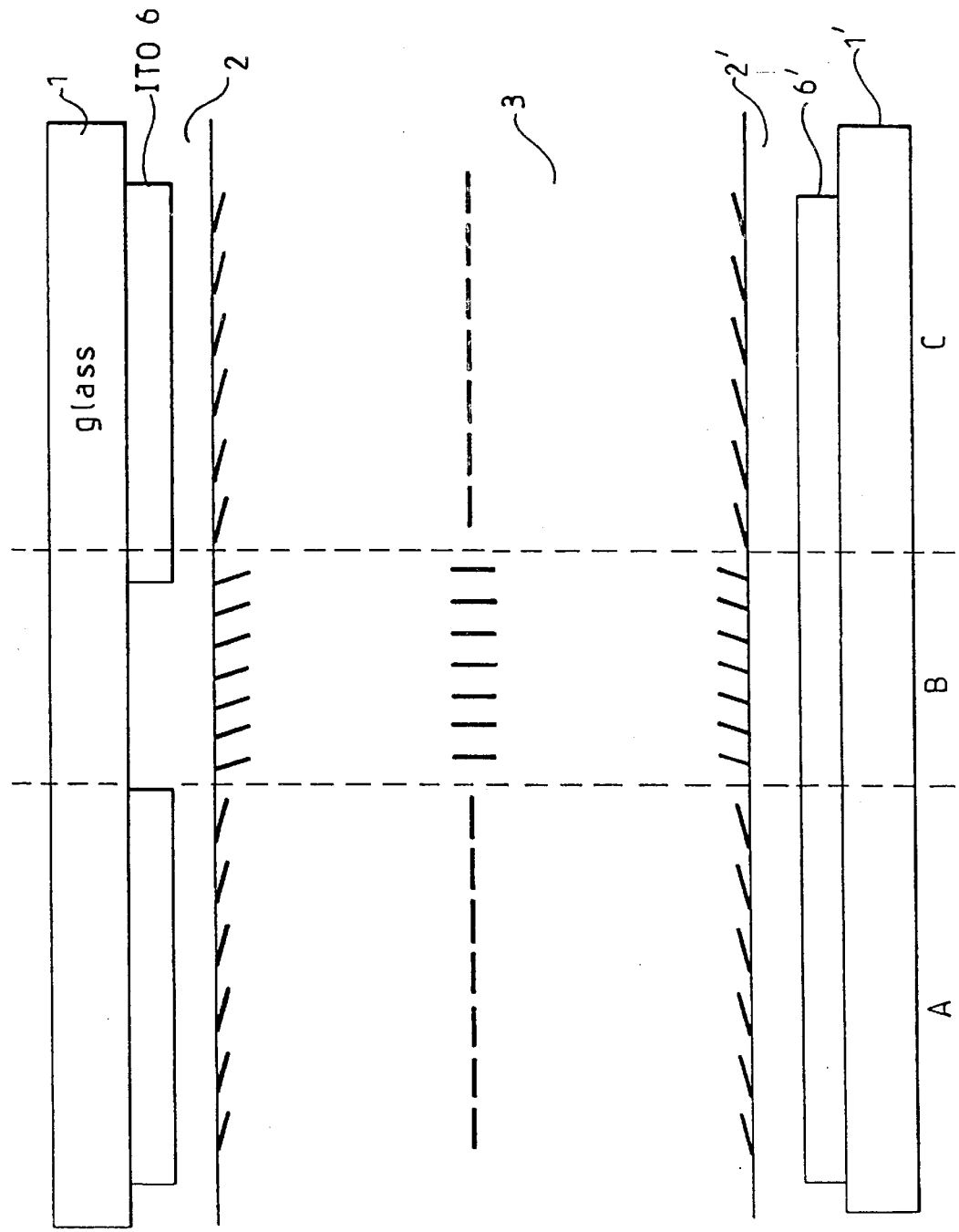

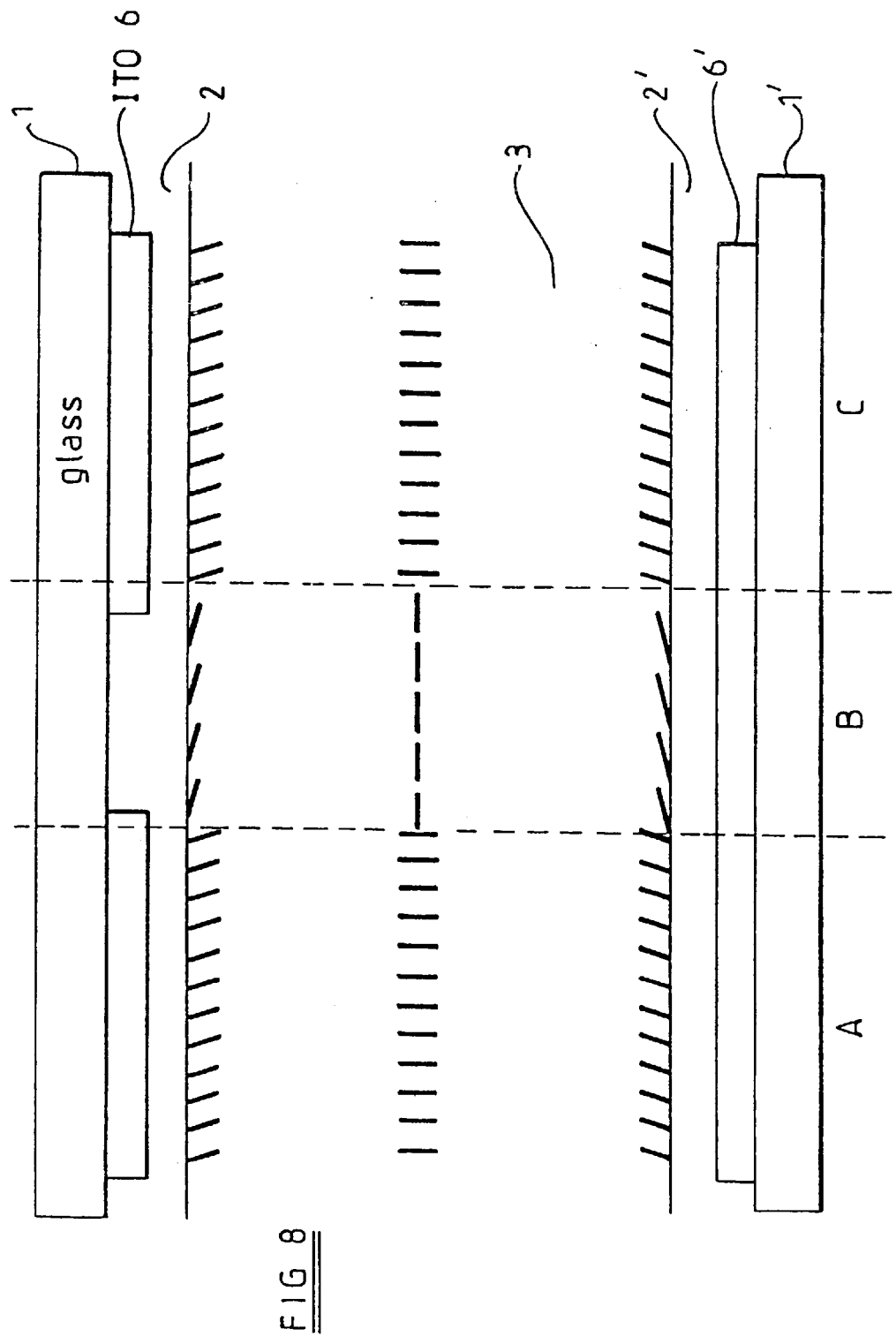

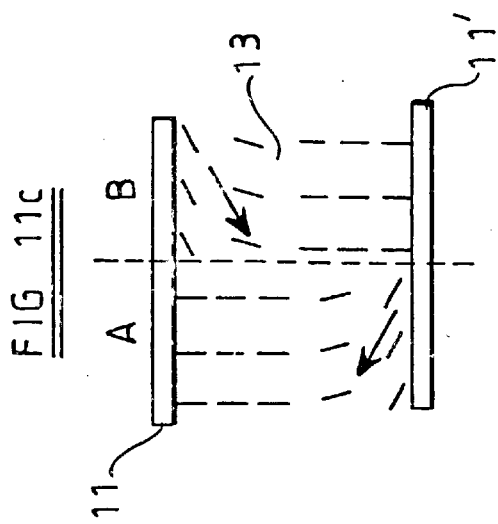
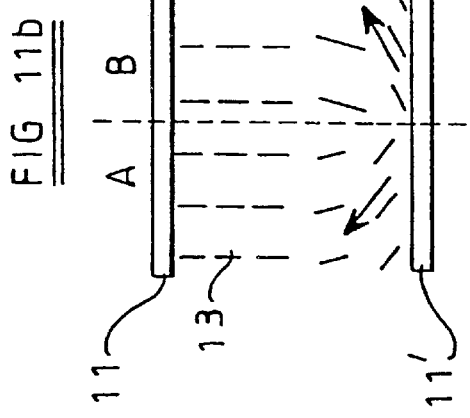
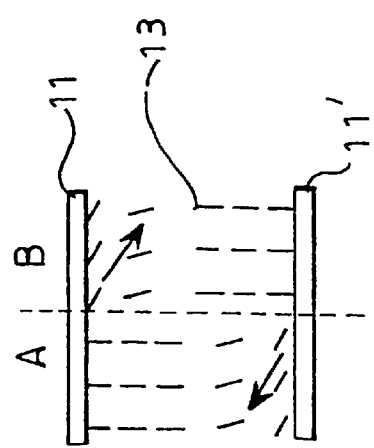
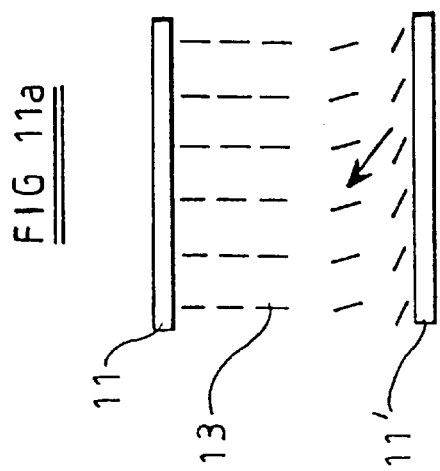
FIG 11a
FIG 11b
FIG 11c
FIG 11d

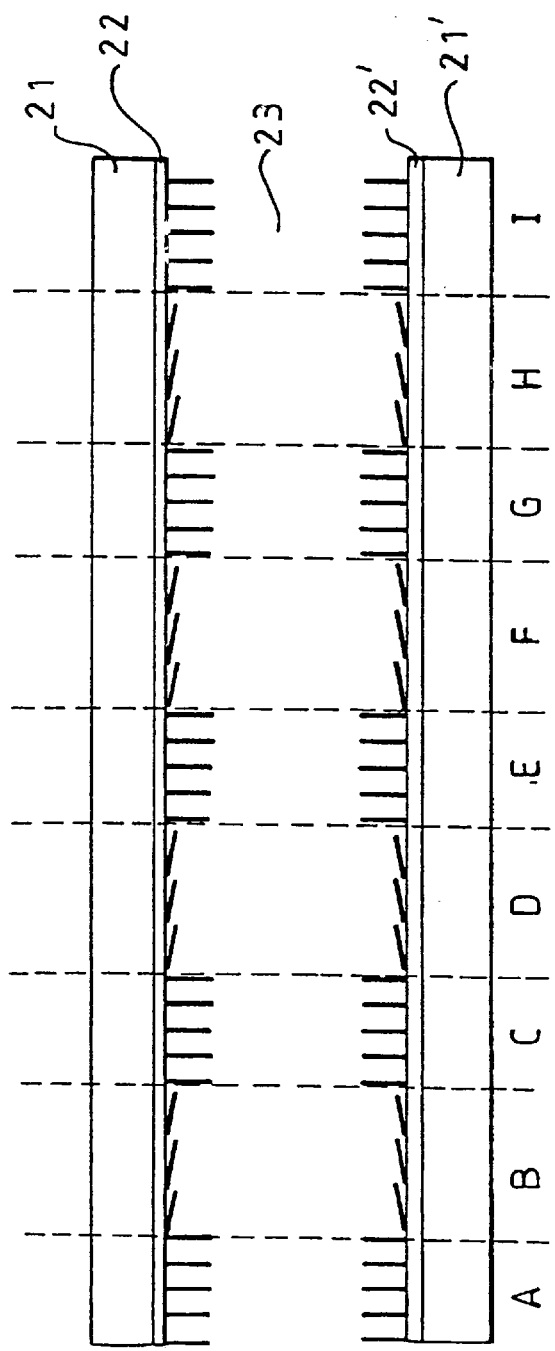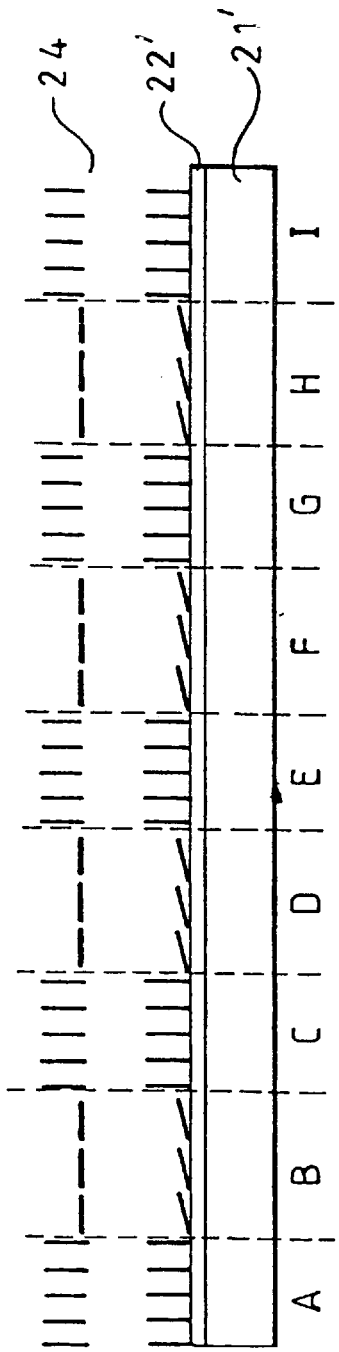
FIG 12a
FIG 12b

LIQUID CRYSTAL DISPLAY DEVICE AND A METHOD OF MANUFACTURE THEREOF, AND A SUBSTRATE AND A METHOD OF MANUFACTURE THEREOF

The present invention relates to a liquid crystal display device, and in particular to a surface mode LCD such as a pi-cell device or a splay-bend device (SBD). The application also relates to a method of manufacture of these devices. The invention also relates to a substrate having one region of high pre-tilt and another region of lower pre-tilt, and to a method of manufacture of such a substrate.

The term "surface mode LCD" as used herein means a LCD in which the optical change caused by varying the electric field across the liquid crystal layer occurs primarily in the surface layers of the liquid crystal. Examples of surface mode LCDs are the pi-cell and the splay-bend device, although other types of surface mode LCDs are known. Surface mode LCDs are disclosed in "Sov. J. QE", 1973, Vol 3, p78–79.

The pi-cell (otherwise known as an "optically compensated birefringent device" or OCB) is described in "Mol. Cryst. Liq. Cryst.", 1984, Vol 113, p329–339, and in U.S. Pat. No. 4,635,051. The structure of a pi-cell is schematically illustrated in FIG. 1. The device comprises transparent substrates 1, 1' on which are disposed alignment layers 2, 2'. A layer of nematic liquid crystal 3 is disposed between the substrates 1, 1'.

The alignment layers 2, 2' create parallel alignment of the liquid crystal molecules in the liquid crystal layer 3 at its boundaries with the alignment layers 2, 2'. This can be achieved by using parallel-rubbed polyimide alignment layers.

Addressing electrodes (not shown) are provided on the substrates 1, 1', so that an electric field can be applied to selected areas of the liquid crystal layer. The liquid crystal layer 3 is placed between linear polarisers 4, 4', whose transmission axes are crossed with one another and are at 45° to the optic axis of the liquid crystal layer.

A retarder 5, with its optic axis parallel to the optic axis of the liquid crystal layer, may optionally be provided to compensate for the retardation of the liquid crystal layer. The retarder lowers the required range for the operating voltage by allowing zero retardation of the LCD to be achieved at a finite voltage across the liquid crystal layer.

The principle of operation of the pi-cell device is illustrated in FIGS. 2(a) to 2(c).

When no electric field is applied across the liquid crystal layer, the liquid crystal is in an H-state (homogenous state), in which the liquid crystal molecules in the centre of the liquid crystal layer are substantially parallel to the substrates. This is shown in FIG. 2(a). The short lines in the figures represent the director of the liquid crystal molecules.

When an electric field greater than a threshold value is applied across the liquid crystal layer, the liquid crystal molecules adopt a V-state (or a bend state). In this state, the liquid crystal molecules in the centre of the liquid crystal layer are substantially perpendicular to the substrates. FIG. 2(b) shows a first V-state which occurs at a low applied voltage across the liquid crystal layer, and FIG. 2(c) shows a second V-state which occurs when a higher voltage is applied across the liquid crystal layer. The pi-cell is operated by switching the liquid crystal layer between the first, low voltage V state and the second, higher voltage V-state.

If the electric field across the liquid crystal layer should be reduced below the threshold value, the liquid crystal layer will relax to the H-state of FIG. 2(a); in order to re-commence operation of the device, it is necessary to put the liquid crystal layer back into the V-state. This generally requires a large applied voltage, owing to the low pre-tilt of the liquid crystal molecules. The pre-tilt is usually below 45° and typically between 2 and 10° so as to provide sufficient optical modulation and fast switching between the two V-states (for instance of the order of a millisecond or less).

One problem with known OCB devices is the difficulty of nucleating and stabilising the V-state, which is topologically distinct from the H-state. One prior art technique is described in UK Patent Application 9521043.1. In this prior technique, the V-state is nucleated under the application of a high voltage, and is stabilised by the polymerisation of a network whilst a high voltage is applied. This prior art technique is, however, unsuitable for use in active matrix devices, since it is difficult to apply voltages having the required magnitude in a TFT panel. A further disadvantage is that the in-situ polymerisation can lead to ionic contamination of the liquid crystal layer, and result in image sticking.

The SBD device, which is also a surface mode device, is described in UK Patent Application No. 9712378.0. The structure of a SBD device is generally similar to that of a pi-cell, except that the alignment layers in a SBD device have a high pre-tilt whereas the alignment layers in a pi cell have a low pre-tilt. An SBD device uses a liquid crystal material with a negative di-electric anisotropy, whereas a pi-cell uses a liquid crystal material having a positive di-electric anisotropy.

The principle of operation of a SBD is illustrated in FIGS. 3(a) to 3(c). When no voltage is applied across the liquid crystal layer, a V-state is stable as shown in FIG. 3(a). When an electric field greater than a threshold value is applied across the liquid crystal layer, an H-state becomes stable. FIG. 3(b) shows a first H-state which occurs at a low applied voltage across the liquid crystal layer, and FIG. 3(c) shows a second H-state which occurs when a higher voltage is applied across the liquid crystal layer. In operation, the device is switched between the low voltage H-state of FIG. 3(b) and the high voltage H-state of FIG. 3(c). If the electric field across the liquid layer is reduced below the threshold value, the liquid crystal will relax into the V-state, and it will be necessary to put the liquid crystal back into the H-state before operation can be re-commenced.

The high pre-tilt alignment layers required for a SBD can be produced, for example, by the photo-polymerisation of a mixture of reactive mesogens, as described in UK Patent Application No. 9704623.9.

SID 97 Digest, page 739, discloses a method of promoting nucleation of the V-state in a pi-cell. Voltages of the order of 20 V are applied across the liquid crystal layer to switch the liquid crystal from the H-state to the V-state. However, it is difficult to provide voltages of this magnitude in a TFT (thin film transistor) substrate.

Japanese published Patent Application JP-A-9 90432 (Toshiba) discloses the provision of nucleation sites within a pi-cell panel. The nucleation sites are provided by including spacer balls or pillars within the pi-cell panel, and cooling the liquid crystal material from an isotropic phase to a nematic phase while an electric field is applied across the panel. This results in some of the spacer balls/pillars acting as nucleation sites for growth of the V-state into the H-state. This prior art has a number of disadvantages. Firstly, it requires additional process steps during fabrication of the panel, since it is necessary to align the liquid crystal molecules under the influence of an applied electric field. These additional process steps complicate the fabrication of the panel. Secondly, some spacer balls/pillars can nucleate the H-state into the V-state thus destabilising the operating state of the panel.

Japanese published Patent Application JP-A-9 218411 discloses an LCD having a bend alignment state which is stabilised, in the absence of an applied field, by the presence of spacers in the form of spherical particles. The spacers have a surface energy such that liquid crystal molecules adjacent the alignment layers are mainly aligned parallel to the alignment layers. However, in order for this technique to work, a field has to be applied during the initial alignment of the device. Also, the particles cannot be positioned so as to be outside the pixel apertures so that the contrast ratio of the display is reduced by the presence of the particles.

Miwa et al IDW 97-Digest page 739 disclose a method of maintaining the stability of a V-state in a pi-cell. A resetting period is provided within each frame, and the high voltage V-state is addressed in this period. This prevents the liquid crystal layer relaxing to the H-state when low driving voltages are applied. This does not, however, address the initial nucleation of the V-state from the H-state.

U.S. Pat. No. 4,400,060 discloses a liquid crystal cell in which the liquid crystal is switched between an H-state and a V-state to obtain optical modulation i.e. the optical state of each pixel is defined by being either in the V-state or in the H-state. Pixels defined in the liquid crystal layer are separated from one another by a neutral isolation region, which completely separates a pixel from an adjacent pixel. The isolation region is to prevent a disclination at the boundary of one pixel drifting into an adjacent pixel and causing inadvertent switching of the adjacent pixel. The isolation regions are defined by varying the pre-tilt of one alignment film. This gives rise to a pinned disclination along the whole perimeter or boundary of each pixel.

U.S. Pat. No. 5,781,262 discloses a technique for making an LCD in which the liquid crystal layer in each pixel has domains of different orientations in order to improve the viewing angle characteristics. A polyimide orientation film is subjected to a first rubbing step, after which selected portions of the film are masked. The unmasked portions are then subjected to a second rubbing step in the opposite direction. This technique results in an alignment layer which provides very low pre-tilt angles.

U.S. Pat. No. 5,757,454 also discloses a technique for making an LCD with pixel domains having different orientations. The alignment layer is initially rubbed in a first direction and selected portions are masked. The unmasked portions are then rubbed in a different direction (not opposite the first direction) so as to define the different domain orientations. This results in different portions of the alignment layer having different directions of pre-tilt.

A first aspect of the present invention provides a liquid crystal display device comprising: a liquid crystal layer disposed between first and second substrates; and means for applying a voltage across the liquid crystal layer; wherein, when no voltage is applied across the liquid crystal layer, a first liquid crystal state is stable in a first volume defined in the liquid crystal layer and a second liquid crystal state is stable in a second volume defined in the liquid crystal layer; and wherein, when a voltage greater than a threshold voltage is applied across the liquid crystal layer, a third liquid crystal state becomes stable in the second liquid crystal volume, characterised in that the area of the first substrate corresponding to the first liquid crystal volume does not enclose the area of the first substrate corresponding to the second liquid crystal volume.

The first liquid crystal volume is acting as a nucleation region, and promotes the change of the second liquid crystal volume to the third liquid crystal state. A lower applied voltage is required to put the second liquid crystal volume in the third liquid crystal state than if the nucleation region is not provided.

The third stable state may be the same type of state as the first stable state. The first liquid crystal state may remain stable in the first volume defined in the liquid crystal when a voltage greater than the threshold voltage is applied across the liquid crystal layer.

The first stable state may be a HAN-state, the second stable state may be an H-state, and the third stable state may be a V-state. Alternatively, the first stable state may be a V-state and the second stable state may be an H-state, and the third stable state may be a V-state. The device may be a pi-cell.

The first stable state may be a HAN-state, the second stable state may be a V-state, and the third stable state may be an H-state. Alternatively, the first liquid crystal state may be an H-state and the second liquid crystal state may be a V-state. The device may be a splay-bend device.

The area of the first substrate corresponding to the first liquid crystal volume may have a different pre-tilt than the area of the first substrate corresponding to the second liquid crystal volume. The area of the second substrate corresponding to the first liquid crystal volume may also have a different pre-tilt than the area of the second substrate corresponding to the second liquid crystal volume. These are straightforward ways to define the first and second volumes in the liquid crystal region.

The first liquid crystal volume may comprise a liquid crystal material dispersed in a polymer matrix. This represents an alternative way of defining the first and second volumes in the liquid crystal layer.

The area of the first substrate corresponding to the first liquid crystal volume may be completely enclosed by the area of the first substrate corresponding to the second liquid crystal volume.

A second aspect of the present invention provides a method of operating a liquid crystal display device comprising the steps of: providing a liquid crystal display device having a liquid crystal layer; defining first and second volumes in the liquid crystal layer such that a first liquid crystal state is stable in the first volume defined in the liquid crystal layer and a second liquid crystal state is stable in the second volume defined in the liquid crystal layer when no voltage is applied across the liquid crystal layer; and applying a voltage across the liquid crystal layer such that the third liquid crystal state becomes stable in the second volume defined in the liquid crystal layer.

The third liquid crystal state may be the same type of state as the first liquid crystal state. The first liquid crystal state may be a V-state and the second liquid crystal state may be an H-state, or the first liquid crystal state may be an H-state and the second liquid crystal state may be a V-state.

The first liquid crystal state may be a HAN-state, the second liquid crystal state may be an H-state, and the third liquid crystal state may be a V-state, or the first liquid crystal state may be a HAN-state, the second liquid crystal state may be a V-state, and the third liquid crystal state may be an H-state.

It can be seen that the principle of this invention is quite different from U.S. Pat. No. 4,400,060. In this prior art document, the liquid crystal regions which do not switch when a voltage is applied are the "neutral isolation regions", and it is essential that these completely surround the active pixel areas of the liquid crystal layer. In contrast, in the present invention, the first liquid crystal region—the "nucleation region"—is not required to surround the second liquid crystal region. Indeed, the first liquid crystal region may be completely enclosed by the second liquid crystal region. In contrast with the disclosure of U.S. Pat. No. 4,400,060, the present invention ensures that, at zero applied voltage, a non-pinned disclination is present in or in near proximity to each pixel. On application of a voltage, the disclination moves over the pixel area to initialise one defined operating state, for example the V-state or the H-state, which is different from the zero voltage state. The optical modulation state of each pixel is then defined by the voltage applied to this state.

The present invention allows one or more V-state nucleation regions to be fabricated into an OCB device. Providing these nucleation regions allows the remainder of the liquid crystal region to be put into the V-state for a relatively low applied voltage, so that the device is compatible with a TFT panel. The nucleation regions are provided by varying an alignment condition, for example the surface pre-tilt, over the liquid crystal layer.

The present invention can also be applied to other types of surface mode LCDs, such as an SBD device.

A third aspect of the present invention provides a method of manufacturing a substrate comprising the steps of: (a) providing a high pre-tilt alignment layer; and (b) rubbing one or more selected areas of the alignment layer so as to reduce the pre-tilt of the rubbed area(s) and leaving at least one unselected area of the alignment layer unrubbed so as to retain the high pre-tilt.

The method may comprise the further step of (c) masking the alignment layer except for the one or more selected areas, the step (c) being carried out before the step (b).

The un-rubbed alignment layer may have a pre-tilt of substantially 90°. This will produce homeotropic alignment of a liquid crystal layer placed adjacent to the alignment layer. Alternatively, the un-rubbed alignment layer may produce a conical alignment condition.

The alignment layer may be a polymer alignment film.

A fourth aspect of the present invention provides a substrate produced by a method as defined above.

A fifth aspect of the present invention provides a liquid crystal display device comprising a substrate as defined above. The device may be a parallax barrier, or it may be a HAN device having two or more liquid crystal domains.

Preferred embodiments of the present invention will now be described by way of illustrative examples with reference to the accompanying Figures, in which:

FIG. 1 is a schematic sectional view of an OCB device (pi-cell);

FIGS. 2(a) to 2(c) illustrate the principle of operation of an OCB device;

FIGS. 3(a) to 3(c) illustrate the principle of operation of an SBD device;

FIG. 4(a) is a schematic sectional view of a first embodiment of the present invention;

FIG. 4(b) is a schematic sectional view of a second embodiment of the present invention;

Figure 1:
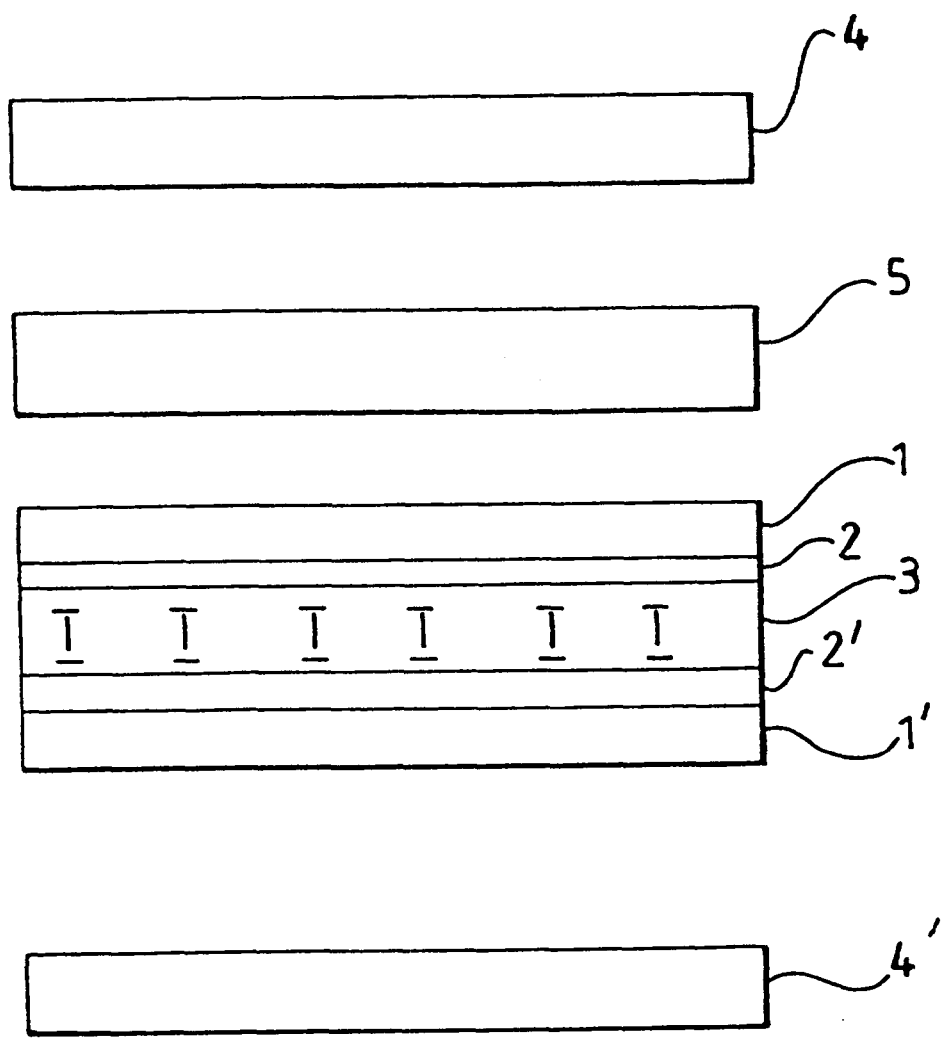
Figure 5B:
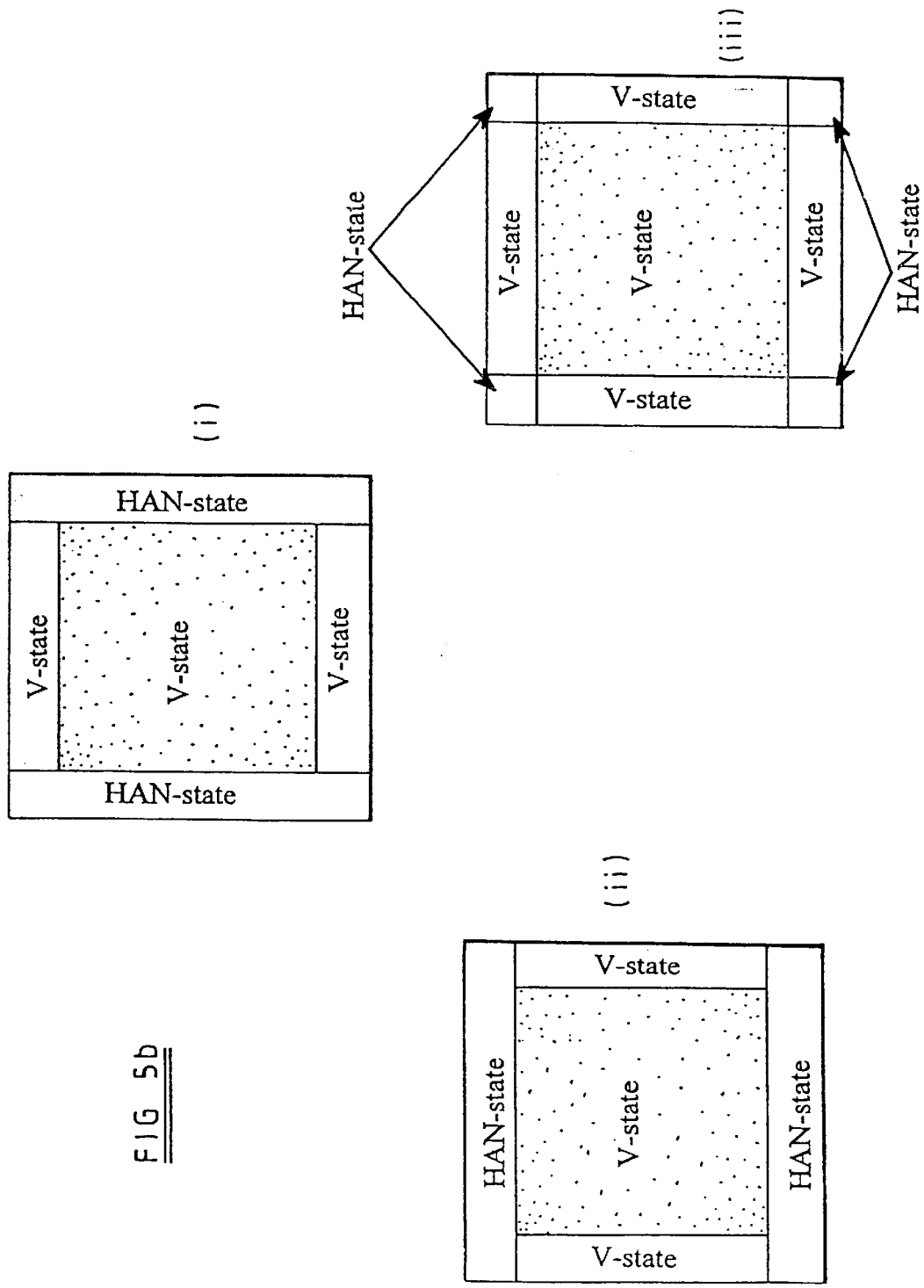
Figure 9:
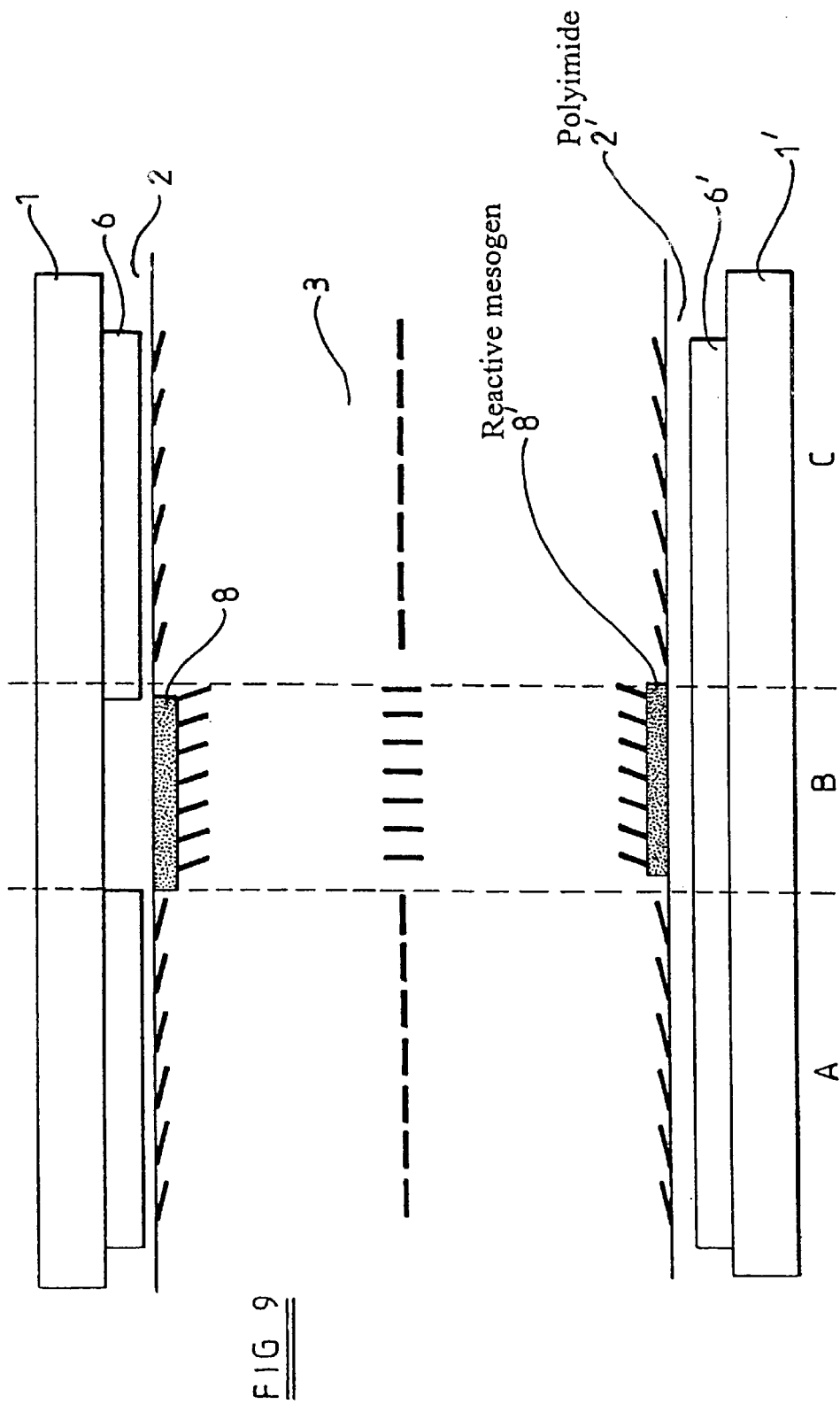
Figure 10:
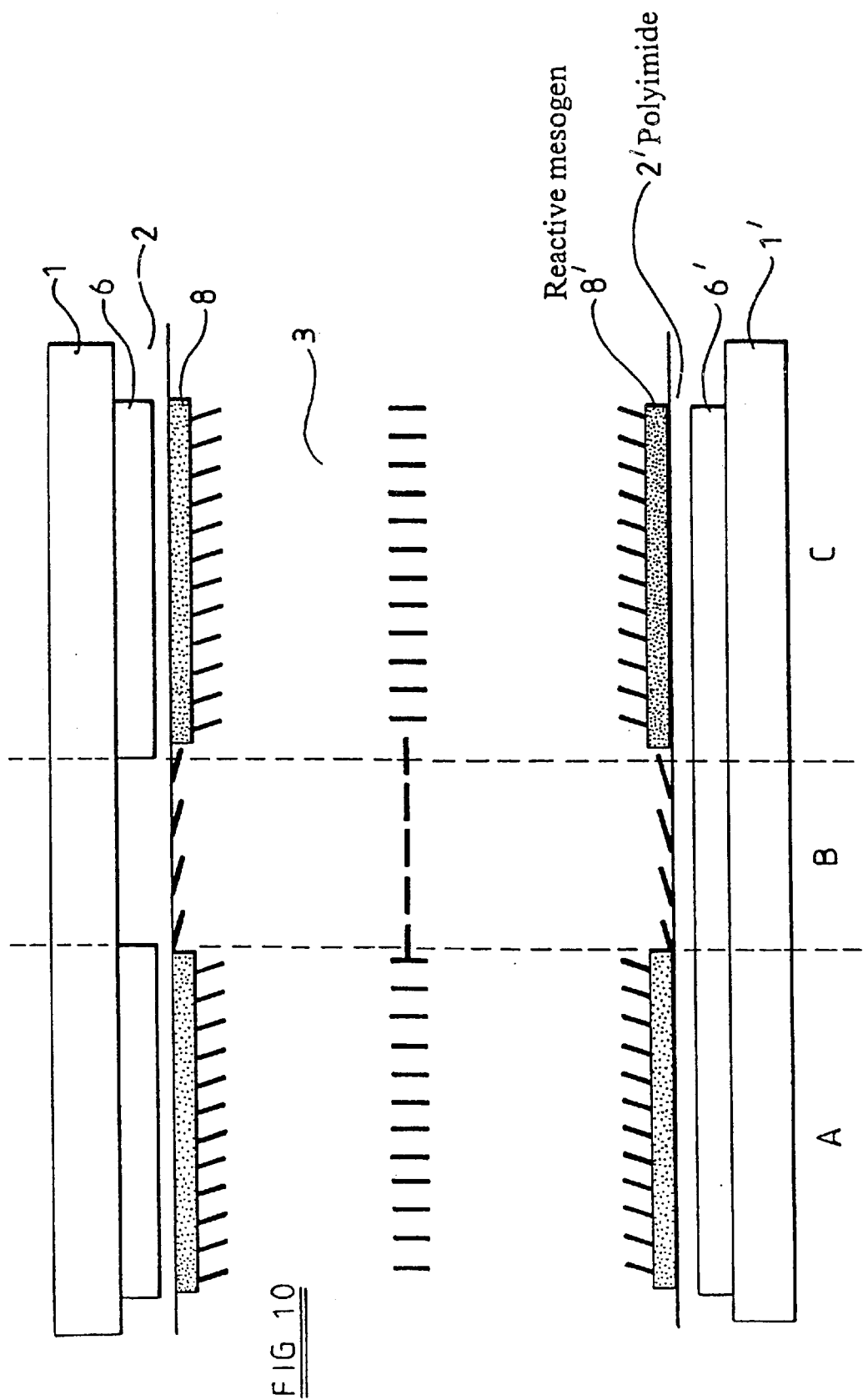
Figure 11E:
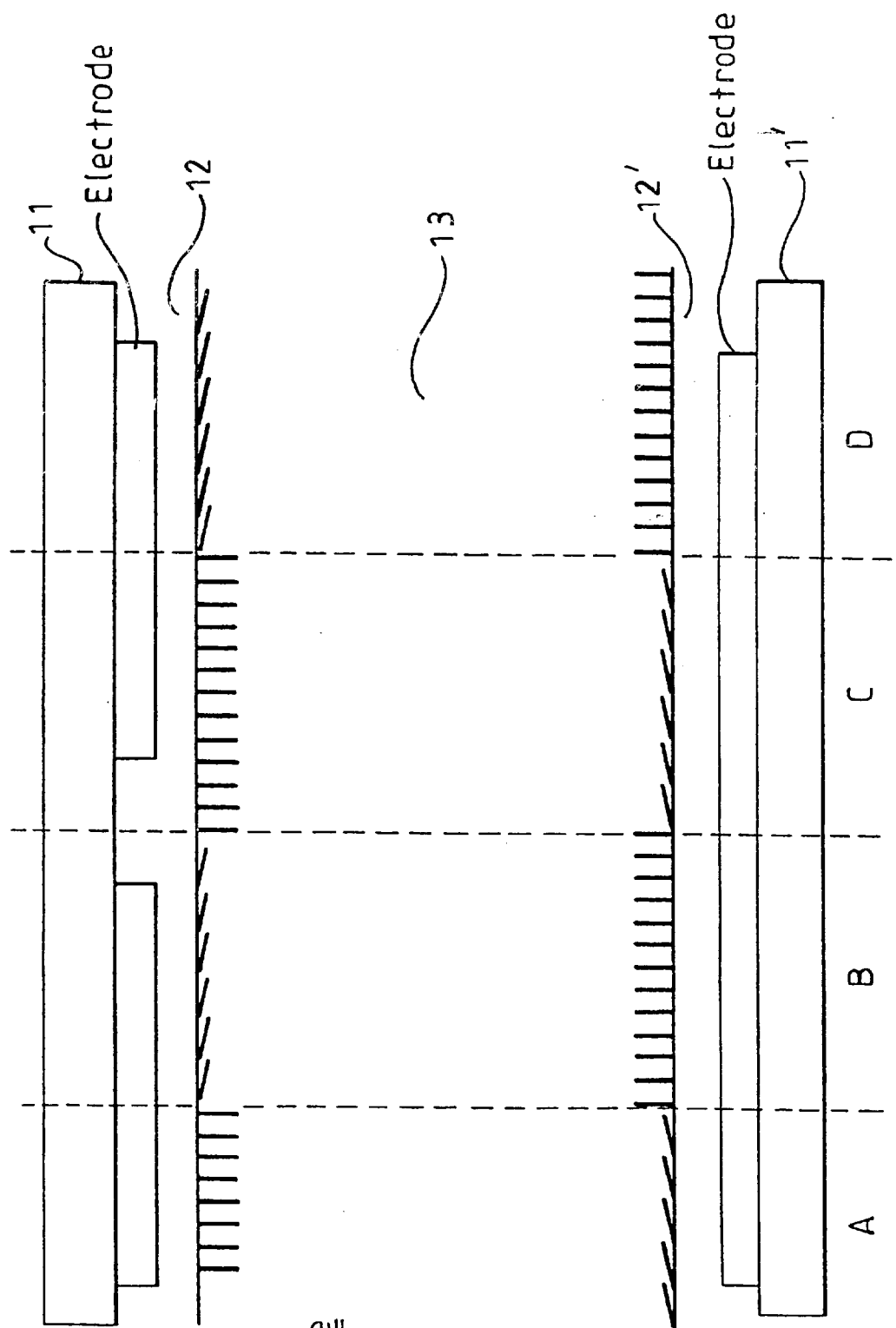

FIGS. 5(a)(i) to 5(a)(iii) are schematic plan views corresponding to FIG. 4(a);

FIGS. 5(b)(i) to 5(b)(iii) are schematic plan views corresponding to FIG. 4(b);

FIGS. 6(a) to 6(f) are schematic illustrations of a method of manufacturing the devices shown in FIGS. 4(a) and 5(a);

FIG. 7 is a schematic sectional view of a further embodiment of the present invention;

FIG. 8 is a schematic sectional view of a further embodiment of the present invention;

FIG. 9 is a schematic sectional view of a further embodiment of the present invention;

FIG. 10 is a schematic sectional view of a further embodiment of the present invention;

FIG. 11(a) is a schematic sectional view of a conventional HAN liquid crystal display device;

FIG. 11(b) is a schematic sectional view of a conventional multi-domain HAN liquid crystal display device;

FIG. 11(c) is a schematic sectional view of a multi-domain HAN liquid crystal display device according to an embodiment of the present invention;

FIG. 11(d) is a schematic sectional view of another multi-domain HAN liquid crystal display device according to an embodiment of the present invention;

FIG. 11(e) is a schematic sectional view of another multi-domain HAN liquid crystal display device according to an embodiment of the present invention;

FIG. 12(a) is a schematic sectional view of a parallax barrier according to an embodiment of the present invention;

FIG. 12(b) is a schematic sectional view of another parallax barrier according to an embodiment of the present invention.

A first embodiment of the present invention is shown in FIG. 4(a). This embodiment is an OCB device, or pi-cell, and comprises upper and lower substrates 1, 1' each of which is provided with an alignment layer 2, 2'. ITO pixel electrodes 6 are provided on the upper substrate 1, and a common ITO electrode 6' is provided over the lower substrate 1'.

The upper alignment layer 2 has a constant pre-tilt. However, the lower alignment layer 2' does not have a constant pre-tilt. Regions A and C have a low pre-tilt, whereas region B has a high pre-tilt. When no voltage is applied across the liquid crystal layer 3, an H-state is stable in regions A and C. Because of the difference in pre-tilt in region B, however, the stable state in region B at zero applied voltage is not an H-state. Instead, it is a HAN-state (hybrid aligned nematic state). An example of a suitable pre-tilt for regions A and C of the lower alignment layer 2' is 2° to 10°. The pre-tilt for region B of the lower alignment layer 2' should be at least 45°, and should preferably be greater than 80°.

When an electric field greater than a threshold value is applied across the liquid crystal cell of FIG. 4(a), the V-state will form at the interfaces between the HAN-state of region B and the H-state of regions A and C. Once the V-state has nucleated in this way, it will grow to replace the H-states in regions A and C. The provision of the "nucleation" region, region B, allows a V-state to be achieved in regions A and C at a significantly lower threshold electric field, and thus at a significantly lower applied voltage, than if the nucleation region is not provided. Whereas the threshold voltage for switching a conventional pi-cell is normally greater than 10 V, it has been found that providing a nucleation region according to the present invention reduces the threshold voltage to around 2.5 V.

When an applied voltage is applied across the liquid crystal cell of FIG. 4(a), the region B will remain in a HAN state, although there will be some re-orientation of the liquid crystal molecules. At high applied voltages, most of the molecules in region B will be aligned perpendicular to the substrates, with only those molecules close to the low pre-tilt substrate (i.e., the upper substrate in FIG. 4(a)) not being aligned perpendicular to the substrates.

FIG. 4(b) is a sectional view showing the present invention applied to a SBD device. The SBD device of FIG. 4(b) again comprises an upper substrate 1 provided with an alignment layer 2. ITO pixel electrodes 6 are provided on the upper substrate 1.

The lower substrate 1' is provided with an ITO common electrode 6' and an alignment layer 2'.

The lower alignment layer 2' does not have a constant pre-tilt. In regions A and C, which substantially correspond to the pixel regions of the liquid crystal, the pre-tilt is high (at least 45° and preferably greater than 80°). However, in region B the pre-tilt is low, for example in the range 2°–10°. The upper alignment layer 2 provides a constant, high pre-tilt (of at least 45° and preferably greater than 80°).

When no voltage is applied across the liquid crystal layer, the stable liquid crystal state in regions A and C is a V-state. As a consequence of the different pre-tilt of the lower alignment film 2' in region B, however, the V-state is not the stable state in region B. Instead, a HAN-state is stable in region B. When an operating voltage is applied across the liquid crystal layer, an H-state forms at the interface between the HAN state of region B and the V-state of regions A and C, and subsequently displaces the V-state in regions A and C. The device is then operated as described with reference to FIGS. 3(*a*) to 3(*c*). The provision of the low pre-tilt region on the lower alignment film 2' means that an H-state is nucleated at a lower electric field, and thus at a lower applied voltage, than if the low pre-tilt region is not provided. This avoids the need to apply a high voltage across the liquid crystal layer in order to nucleate the H-state.

The region B remains in a HAN state when a voltage is applied across the liquid layer. As with the device of FIG. 4(*a*), however, there will be some re-orientation of the liquid crystal molecules as a voltage is applied. At high applied voltages, the liquid crystal molecules in region B will be aligned parallel to the substrates, except for those molecules close to the high pre-tilt substrate (i.e., the lower substrate in FIG. 4(*b*)).

The present invention is not restricted to the embodiments shown in FIGS. 4(*a*) and 4(*b*). In general, the criterion for a suitable nucleation region is that, when there is no applied electric field, one liquid crystal state is stable in a first region of the liquid crystal layer (the nucleation region) and another liquid crystal state is stable in a second region of the liquid crystal layer, with there being a disclination between the two regions of the liquid crystal layer. The stable liquid crystal state in the region that is not the nucleation region is not the desired operating state, and will be referred to as the "undesired stable state".

When an electric field greater than a threshold field is applied across the liquid crystal layer, the desired operating state is obtained in the second liquid crystal region as a result of the movement of the disclination, from its initial position at the boundary between the nucleation region and the second region liquid crystal, into the second liquid crystal region. This movement of the disclination causes the undesired stable state in the second liquid crystal region to be replaced by the desired operating state. Once the desired operating state has completely replaced the undesired stable state in the second liquid crystal region, the disclination is annihilated and this further stabilises the desired operating state. The desired operating state will remain the stable state in the second liquid crystal region as long as the electric field is kept above the threshold field.

For the example of a pi-cell, the nucleation region should have, at some point in its volume, a director configuration that is substantially perpendicular to the substrates. In the case of an SBD device the nucleation region should contain, at some point in its volume, a director configuration substantially parallel to the substrates. These director configurations will set up a disclination in zero applied electric field between the nucleation region and the second region of the liquid crystal layer.

The reduction in the threshold electric field required to switch a liquid crystal cell of the present invention arises because the disclination is present at the boundary between the nucleation region and the second liquid crystal region even when there is no applied electric field across the liquid crystal layer. When an electric field is applied, it has only to initiate and maintain the movement of the disclination. In contrast, in a prior art liquid crystal cell that does not have a nucleation region, it is necessary for the applied electric field first to generate the disclination, and this requires a large electric field.

The state that is stable in the nucleation region of the liquid crystal layer at zero applied field will remain stable in the nucleation region when an electric field is applied. In the embodiment of FIG. 4(*a*), for example, the stable state in the nucleation region is always a HAN state. The applied field may, however, alter the director of the liquid crystal molecules in the nucleation region.

It is not necessary for the nucleation region to extend over the entire thickness of the liquid crystal layer. Indeed, the nucleation region in, for example, FIG. 4(*a*) can be considered as not extending over the whole thickness of the liquid crystal layer. The director of the liquid crystal molecules near the un-patterned (i.e., upper) substrate 1 is substantially parallel to the substrates, so that the liquid crystal near the upper substrate in region B does not act as a nucleation region.

FIG. 5(*a*) is a plan view illustrating some possible arrangements of the H-state regions and the HAN state regions of the device of FIG. 4(*a*) when no voltage is applied across the liquid crystal layer. In FIG. 5(*a*)(*i*) the shaded H-state region corresponds to the pixel region, and the HAN-state regions are the inter-pixel regions that are shown extending vertically in FIG. 5(*a*)(*i*). The inter-pixel regions that are shown as horizontally extending in FIG. 5(*a*)(*i*) are H-state regions.

The arrangement shown in FIG. 5(*a*)(*ii*) is similar to that shown in FIG. 5(*a*)(*i*), except that the HAN regions 7, 7' now occupy the horizontally extending inter-pixel regions, with the vertically-extending inter-pixel regions being H-state regions.

In FIG. 5(*a*)(*iii*), the majority of the area of the inter-pixel regions is H-state. The HAN-state regions are confined to four small regions 9, one positioned at each corner of the pixel. If this embodiment is used, 30 $\mu$m×30 $\mu$m HAN-state regions are found suitable for a 300 $\mu$m×300 $\mu$m pixel size.

FIG. 5(*b*) corresponds to FIG. 5(*a*), but relates to the SBD device of FIG. 4(*b*).

One method of producing a device according to the invention will now be described with reference to FIGS. 6(*a*) to 6(*f*). In this method, the lower alignment film is made of Nissan Chemical Industries' polyimide RN-715 (type 0621). An unrubbed layer of this material gives a 90° pre-tilt, whilst rubbing reduces the pre-tilt. Depending upon the rubbing conditions, the pre-tilt can be reduced to as low as 4°. A layer 12 of RN-715 polyimide dissolved at a ratio of 1:3 in NMP was spun onto a clean glass substrate 1' coated with an ITO layer 6'. The polyimide was spun onto the substrate at 5 krpm for 30 seconds, after which the polyimide was heated to 90° C. for two minutes and then cured at 250° C. for one hour. This is shown in FIG. 6(*a*).

The layer 12 of polyimide was then spun coated with a layer 13 of positive photo-resist (photo-resist Microposit S1805 series from Shipley, Europe Limited) at 4.5 krpm for 40 seconds, to give a photo-resist layer having a thickness of around 500 nm. The photo-resist layer was then given a soft bake of around 2 minutes at 95° C. to evaporate the solvent (FIG. 6(b)). The photo-resist layer 13 was then patterned by irradiating selective parts of the photo-resist layer. The irradiation step involved a 3.5 second exposure to UV light (having a peak wave length of 365 nm) at an intensity of 6.9 mW/cm². The radiation step was carried out through a UV-chrome photo-mask in the hard contact mode of a mask aligner. The photo-resist layer was then developed for one minute using the developer Microposit 351 CD31, to remove the photo-resist from the regions exposed to UV light. This left a positive reproduction of the photo-mask pattern formed in the photo-resist (FIG. 6(c)). The substrates were then thoroughly rinsed in de-ionised water for 2 minutes, to ensure complete removal of the exposed photo-resist.

A low pre-tilt, planar alignment was induced in the unmasked regions by rubbing the alignment layer three times with a rubbing cloth (YA-20-R), on a roller rotating at 3 krpm at a pile deformation of 0.3 and with a forward speed of 20 mm/s (FIG 6(d)).

The remaining photo-resist was then removed by immersing the substrate in acetone for 30 seconds and subsequently drying it in a stream of nitrogen gas. The resultant alignment layer contained regions of high pre-tilt, (which corresponds to the unrubbed regions) and regions having a low pre-tilt (corresponding to the rubbed regions).

A second substrate was produced by disposing a layer 2 of RN-715 polyimide on a glass substrate 1 provided with ITO pixel electrodes (not shown in FIG. 6(f)). The polyimide layer was uniformly rubbed to provide a non-patterned, uniform low pre-tilt across the alignment layer. This substrate was then combined with the substrate of FIG. 6(e) to produce a 5 μm cell gap parallel liquid crystal cell as shown in FIG. 6(f).

The cell was filled with MLC6000-100 nematic liquid crystal cell (supplied by Merck). When no voltage was applied across the liquid crystal layer, the cell consisted of regions of H-state separated by regions of HAN state. When a voltage of around 2.5 V was applied across the liquid crystal layer, the V-state formed at the interfaces between the HAN-state regions and the H-state regions, and grew to replace the H-state.

In an alternative fabrication method, the RN-715 polyimide (type 0621) is spun undiluted at 5 krpm for 30 seconds onto a glass substrate coated with an ITO layer. The polyimide is then heated to 90° for 5 minutes and is then cured at 250° C. for one hour.

The layer of polyimide is then spin coated with a positive photo-resist, selectively irradiated, developed, and rinsed in de-ionised water as in the method described above.

A planar alignment is then induced in the unmasked regions by rubbing the alignment layer four times with a rubbing cloth (YA-20-R). The rubbing is carried out on a 50 mm diameter roller, rotating at 3 krpm, at a pile deformation of 0.2 and with a forward speed of 20 mm/s.

The remaining photoresist is then removed by a five second UV flood exposure. This is carried out at an intensity of 6.9 mW/cm² at a wavelength of 365 nm, using a mask aligner, without a mask. The substrate is then immersed in developer Microposit 351 CD31 for sixty seconds. The substrate is then rinsed for two minutes in de-ionised water and is then dried in a nitrogen stream. The resultant patterned alignment layer contains homeotropic regions, which are surrounded by planar regions having 14° pre-tilt.

This process differs from the process described above principally in that the step of immersing the substrate in acetone to remove the photo-resist is eliminated. This is advantageous, since immersing the substrate in acetone makes it difficult to control precisely the pre-tilt of the rubbed polyimide.

FIG. 7 shows a further embodiment of a OCB device according to the present invention. This embodiment is a modification of the embodiment of FIG. 4(a).

In the device shown in FIG. 7, both the upper and lower alignment films 2, 2' have varying pre-tilt. Both the alignment films have a high pre-tilt in region B, and a low pre-tilt in regions A and C. In consequence, a V-state is stable in region B even when no voltage is applied across the liquid crystal layer. When a voltage is applied across the liquid crystal layer, the V-state grows from region B into the adjacent regions A and C. The device is then operated as normal, between the states illustrated in FIGS. 2(b) and 2(c).

The pre-tilt in the nucleation region, region B, is chosen such that at least part of the liquid crystal layer in the nucleation region has its director aligned perpendicular to the substrates (that is, the nucleation region contains a volume of homeotropic alignment). It need not be the same on both substrates—if the pre-tilt at one substrate is (90−θ)°, the pre-tilt at the other substrate should be greater than θ°. The pre-tilt is preferably greater than 45° on both substrates, and is preferably greater than 80°. Such pre-tilts will induce homeotropic alignment within a volume of the liquid crystal in the nucleation region. It is possible for the pre-tilt in region B to be substantially 90° at both substrates, and this will cause homeotropic alignment over the whole thickness of the liquid crystal layer in region B.

A suitable pre-tilt for regions A and C is 2°–10°. The pre-tilts on the two substrates do not need to be the same. The acceptable difference in pre-tilt between the two substrates depends on the pre-tilt. For example, a 2° pre-tilt on one substrate would require the pre-tilt on the other substrate to be in the range of approximately 1°–3° to obtain effective operation. If one substrate had a pre-tilt of 20° in region A or C, however, the other substrate could have a pre-tilt in the range of about 15°–25°.

Although the embodiment of FIG. 7 has a nucleation region in which the V-state is stable when no voltage is applied, it is possible to produce a HAN nucleation region.

FIG. 8 shows a further embodiment of a SBD device. This corresponds generally to the OCB illustrated in FIG. 7.

In the SBD device shown in FIG. 8, the upper and lower alignment layers 2, 2' both have a low pre-tilt in region B, and a high pre-tilt in regions A and C. Thus, an H-state is stable in region B even when no voltage is applied across the liquid crystal layer. A V state is stable in regions A and C at zero applied voltage. Once the lower operating voltage is applied across the liquid crystal layer, the H state grows out from region B into regions A and C, and the device can then be operated as normal between the states shown in FIGS. 3(b) and 3(c). In contrast to the prior art devices, there is no need to apply a high voltage in order to nucleate the H-state.

If the pre-tilt at one substrate in region B is θ°, the pre-tilt at the other substrate should be less than (90−θ)°. The pre-tilt in region B is preferably less than 45° on both substrates, and is preferably less than 10°. A suitable pre-tilt for regions A and C is 80°–89° (as with a pi-cell, the pre-tilt need not be identical at the two substrates).

The devices shown in FIGS. 7 and 8 could be produced by the method described above with reference to FIGS. 6(a) to 6(e). It would be necessary for the alignment layers on both the upper and lower substrates to be selectively rubbed to create regions of high pre-tilt and regions of low pre-tilt.

A modification of the device shown in FIG. 7 is illustrated in FIG. 9. The alignment of the liquid crystal molecules in regions A, B and C of FIG. 9 corresponds to that of FIG. 7. However, the varying pre-tilt on the substrates is not produced by selectively rubbing the alignment layers. In the device illustrated in FIG. 9, the high pre-tilt regions are provided by a layer of reactive mesogen 8, 8', disposed on the alignment films 2, 2'. The alignment films 2, 2' are low pre-tilt alignment films, produced for example by uniformly rubbing a polyimide substrate as described above.

One method of producing the reactive mesogen layers 8,8' of FIG. 9 is to spin a mixture of the acrylate reactive mesogen materials RM 257 and RM 305 (produced by Merck Limited) onto the low pre-tilt rubbed polyimide alignment film. The reactive mesogen materials are then cured by radiation with UV light. The reactive mesogen layers 8, 8' will produce a high pre-tilt, in the region of 80°, as described in co-pending UK Patent Application No. 9704623.9.

FIG. 10 illustrates how the use of reactive mesogen layers can be applied to a SBD device. The device of FIG. 10 is similar to the device of FIG. 8, except that the high pre-tilt regions are produced by disposing layers of reactive mesogen 8, 8' onto alignment layers 2, 2' that have a uniform low pre-tilt. In FIG. 10, the reactive mesogen layers 8, 8' are provided in regions of the liquid crystal cell that correspond to the pixel regions, whereas in the device of FIG. 9 the reactive mesogen layers are provided in the inter-pixel regions.

In the embodiments described above, the nucleation regions have been placed in the inter-pixel gaps. However, this is not an essential feature of the invention. It would be possible to place the nucleation regions within the pixel regions.

The method illustrated in FIGS. 6(a) to 6(e) will produce an alignment film having regions of low pre-tilt and regions of high pre-tilt. Such a substrate has other applications than the devices described in FIGS. 4 to 8 above. For example, such a substrate could be used to produce a multi-domain HAN liquid crystal device as shown in FIG. 11(c).

Multi-domain HAN LCDs are known, and an example of a conventional multi-domain HAN LCD is shown in FIG. 11(b). This comprises a liquid crystal layer 13 disposed between upper and lower substrates 11,11'. The upper substrate 11 is provided with an alignment layer (not shown) that has a uniform pre-tilt of 90° over the whole alignment layer, and produces homeotropic alignment of the liquid crystal molecules. The lower substrate 11' is provided with an alignment layer (not shown) that does not have a uniform pre-tilt. While the amount of pre-tilt provided by the alignment film on the lower substrate 11' is, in principle, the same in regions A and B, the alignment direction of liquid crystal molecules near the lower substrate 11 differs between region A and region B.

A conventional multi-domain HAN LCD as shown in FIG. 11(b) has improved viewing angle characteristics compared with a conventional single-domain HAN LCD, such as that shown in FIG. 11(a). (In the single-domain HAN LCD of FIG. 11(a), the amount and direction of pre-tilt are uniform over the whole of the alignment film (not shown) on the lower substrate 11' as well as over the whole of the alignment film on the upper substrate 11.) However, there are practical problems in fabricating the multi-domain HAN of FIG. 11(b).

If the alignment layer on the lower substrate of the device of FIG. 11(b) is patterned by a rubbing process then a multi-step rubbing process would be used. Firstly, the entire alignment film would be rubbed to give the pre-tilt for region A. Region A would then be masked, and there would be a second rubbing step to produce the desired pre-tilt for region B. It can thus be seen that region B undergoes two rubbing treatments, whereas region A undergoes only one rubbing treatment, and the pre-tilt will be different in the region rubbed only once than in the region that is rubbed twice. Although this difference in pre-tilt may be small, it will nevertheless result in region A appearing optically different from region B when the device is viewed at normal incidence. Moreover, the two regions may also have different operational characteristics such as, for example, switching speeds.

FIG. 11(c) shows a multi-domain HAN LCD according to an embodiment of the present invention. In this device, the alignment film (not shown) on the upper substrate 11 has 90° pre-tilt in region A but a low pre-tilt in region B. Conversely, the alignment film (not shown) on the lower substrate 11' has a low pre-tilt in region A but a 90° pre-tilt in region B. This means that the liquid crystal layer 12 has a symmetric configuration, so that the regions A and B will appear the same when the device is viewed at normal incidence. Regions A and B will also have the same operational characteristics as one another.

A further important advantage of the invention is that the alignment layers on the upper and lower substrates should pin (trap) ions to a similar extent. This is because the pre-tilt varies across the two alignment layers in the same way, and also because the two alignment layers have been subjected to the same processing treatments. The pinning of ions should thus "average out" between the two alignment films, and this will reduce the sticking of images during operation of the device.

Yet another advantage of the invention relates to the prevention of polarisation of the liquid crystal. The flexoelectric effect in nematic liquid crystal materials can cause a polarisation Ps, if a liquid crystal material undergoes a splay or bend deformation such as that in the HAN configuration of the devices shown in FIGS. 11(a) to 11(c). This polarisation is represented by the arrows in FIGS. 11(a) to 11(c). It can be seen that the polarisations induced in the two regions of the device of FIG. 11(b) are accumulative throughout the cell, whereas the polarisations induced in the two regions of the device of FIG. 11(c) approximately cancel one another out in the direction across the liquid crystal layer.

FIG. 11(d) shows a modification of the embodiment of FIG. 11(c). The region A of the device of FIG. 11(d) is the same as the region A of the embodiment of FIG. 11(c). The direction of pre-tilt (relative to the normal to the substrate) of region B of FIG. 11(d) near the upper substrate is reversed compared to the direction of pre-tilt of region B in FIG. 11(c). Thus, in the device of FIG. 11(d) the liquid crystal molecules near the upper substrate in region B are approximately parallel to the liquid crystal molecules near the lower substrate in region A. The polarisation vectors of the two regions are therefore directed in opposite directions, so that the resultant overall polarisation is, in principle, zero.

A further embodiment of a multi-domain HAN LCD according to the invention is shown in FIG. 11(e). This device is similar to that of FIG. 11(c), but has four liquid crystal regions A, B, C and D. Both the upper and lower alignment layers 12, 12' contain alternate regions of low pre-tilt and 90° pre-tilt. The substrates are arranged such that a 90° pre-tilt region on the upper alignment layer is directly over a low pre-tilt region on the lower alignment layer, and such that low pre-tilt regions on the upper alignment layer are placed directly over 90° pre-tilt regions on the lower alignment layer. The regions A, B, C, D shown in FIG. 11(e)

all have a stable HAN liquid crystal state, but the HAN state in regions A and C is inverted compared to the HAN state in regions B and D.

The fabrication method of FIGS. 6(a) to 6(e) can also be applied to the production of a liquid crystal cell structure suitable for a parallax barrier such as the parallax barrier described in co-pending UK patent application No. 9713985.1. Examples of such structures are shown in FIG. 12(a) and FIG. 12(b).

FIG. 12(a) shows a liquid crystal cell structure suitable for a parallax barrier. It comprises a layer 23 of liquid crystal material disposed between upper and lower substrates 21,21'. Each substrate is provided with an alignment layer 22,22'. As with the device of FIG. 11(d), each alignment layer produces alternate regions of low pre-tilt and 90° pre-tilt; however, the substrates are arranged such that a 90° pre-tilt region on the upper alignment layer is directly over a 90° pre-tilt region on the lower alignment layer, and such that low pre-tilt regions on the upper alignment layer are placed directly over low pre-tilt regions on the lower alignment layer.

The liquid crystal material is selected such that the product of its birefringence and the its thickness in the low pre-tilt regions B, D, F, H is the same as the product of the birefringence and thickness of a half wave plate for a wavelength in the middle of the visible spectrum (i.e., for a wavelength of 500–600 nm).

To form a parallax barrier the liquid crystal cell of FIG. 12(a) is placed between, and parallel with, crossed linear polarisers. The homeotropic regions A, C, E, G, I will appear dark, and the low pre-tilt regions B, D, F, H will appear bright. As known to a skilled person, such a structure can be used as a parallax barrier in a 3D autostereoscopic display. The sizes of the homeotropic regions A, C, E, G, I and the low pre-tilt regions B, D, F, H can be selected to correspond with the size of, and spacing between, the pixels of the display.

The alignment direction of the liquid crystal molecules in the low pre-tilt regions is preferably at an azimuthal angle of 45° to the transmission axis of the polarisers, since this produces the highest transmission. However, one advantageous feature of this invention is that a good dark state is obtained even if the azimuthal angle is not precisely 45°. For example, if the azimuthal angle were 30°, the transmission of the bright state would be reduced to ¾ of its value for the ideal case of a 45° azimuthal angle, whilst the dark state remains unchanged. This tolerance allows the fabrication of an autostereoscopic display to concentrate on obtaining good alignment between the parallax barrier and the pixels of the underlying display panel so as to reduce Moiré effects.

FIG. 12(b) shows another liquid crystal device suitable for use as a parallax barrier. This has just a single substrate 21', which is provided with an alignment layer 22' having alternate regions of low pre-tilt and 90° pre-tilt. A layer 24 of photopolymerisable liquid crystal material is disposed over the substrate. This is photopolymerised to produce alternate regions of vertical alignment of the liquid crystal molecules and horizontal alignment of the liquid crystal molecules. The regions of vertical alignment of the liquid crystal molecules are arranged over the regions of 90° pre-tilt of the alignment layer 22', and the regions of horizontal alignment of the liquid crystal molecules are arranged over the regions of low pre-tilt of the alignment layer 22'.

A further embodiment of the present invention (not illustrated) relates to another liquid crystal device having nucleation regions as described above with reference to, for example, FIGS. 4(a) and 4(b). In this embodiment, however, the nucleation regions are not provided by varying the pre-tilt of at least one of the alignment layers. Instead, the alignment layers have a uniform pre-tilt. Small regions of the liquid crystal layer are put into the operating state (that is, the V-state for a pi-cell and the H-state for a SBD device), and these regions of the liquid crystal layer are then polymerised to fix these regions in the operating state. Unlike the case for the prior art described above, only the nucleation regions are polymerised—the remaining areas of the liquid crystal layer are not polymerised.

The polymerisation can be carried out, for example, by the method described in co-pending UK patent application No. 9521043.1. In this method, the liquid crystal layer is a mixture of a liquid crystal compound and a pre-polymer. An electric field is applied across the liquid crystal layer to put the liquid crystal into a predetermined state (such as a V-state in the case of a pi-cell). The liquid crystal is held in this state while selected regions of the pre-polymer are polymerised or cross-linked by, for example, irradiation with UV radiation. The polymer stabilises the predetermined liquid crystal state in the irradiated regions, so that the predetermined state is stable in these regions even when the electric field is removed. The un-irradiated regions are not affected. When the electric field is removed, the liquid crystal in the un-irradiated regions will relax back to the state that is normally stable in the absence of an applied field.

If the present invention is applied to an active matrix pi-cell, each pixel can include a nucleation region in its active area. Either a HAN-state or a homeotropic state is stable in the nucleation region when no voltage is applied across the liquid crystal layer.

In the case of a full colour device in which each pixel is divided into 3 sub-pixels, each sub-pixel may be provided with a nucleation region in its active area.

In the embodiments of, for example, FIGS. 11(e) and 12(a), the high pre-tilt regions of the lower alignment film have a homeotropic alignment (that is, a pre-tilt of 90°). These regions could alternatively have a high pre-tilt conical alignment condition.

What is claimed is:

1. A liquid crystal display device comprising: a liquid crystal layer disposed between first and second substrates; and means for applying a voltage across the liquid crystal layer;

wherein, when no voltage is applied across the liquid crystal layer, a first liquid crystal state is stable in a first volume defining a nucleation region in the liquid crystal layer and a second liquid crystal state is stable in a second volume defined in the liquid crystal layer;

wherein, when a voltage greater than a threshold voltage is applied across the liquid crystal layer, a third liquid crystal state becomes stable in the second liquid crystal volume, wherein the third liquid crystal state forms at a lower applied voltage than if the nucleation region is not provided; and wherein the area of the first substrate corresponding to the first liquid crystal volume does not enclose the area of the first substrate corresponding to the second liquid crystal volume.

2. A device as claimed in claim 1, wherein the third liquid crystal state is the same type of state as the first liquid crystal state.

3. A device as claimed in claim 2, wherein the first liquid crystal state remains stable in the first volume defined in the liquid crystal when a voltage greater than the threshold voltage is applied across the liquid crystal layer.

4. A device as claimed in claim 1, wherein the first liquid crystal state is a HAN-state, the second liquid crystal state is an H-state, and the third liquid crystal state is a V-state.

5. A device as claimed in claim 2, wherein the first liquid crystal state is a V-state, the second liquid crystal state is an H-state, and the third liquid crystal state is a V-state.

6. A device as claimed in claim 1, wherein the device is a pi-cell.

7. A device as claimed in claim 1, wherein the first liquid crystal state is a HAN-state, the second liquid crystal state is a V-state, and the third liquid crystal state is an H-state.

8. A device as claimed in claim 2, wherein the first liquid crystal state is an H-state and the second liquid crystal state is a V-state.

9. A device as claimed in claim 1, wherein the device is a splay-bend device.

10. A liquid crystal display device as claimed in claim 1, wherein the area of the first substrate corresponding to the first liquid crystal volume has a different pre-tilt than the area of the first substrate corresponding to the second liquid crystal volume.

11. A liquid crystal display device as claimed in claim 10, wherein the area of the second substrate corresponding to the first liquid crystal volume has a different pre-tilt than the area of the second substrate corresponding to the second liquid crystal volume.

12. A device as claimed in claim 1, wherein the first liquid crystal volume comprises a liquid crystal material dispersed in a polymer matrix.

13. A device as claimed in claim 1, wherein the area of the first substrate corresponding to the first liquid crystal volume is completely enclosed by the area of the first substrate corresponding to the second liquid crystal volume.

* * * * *